Patented Oct. 30, 1928.

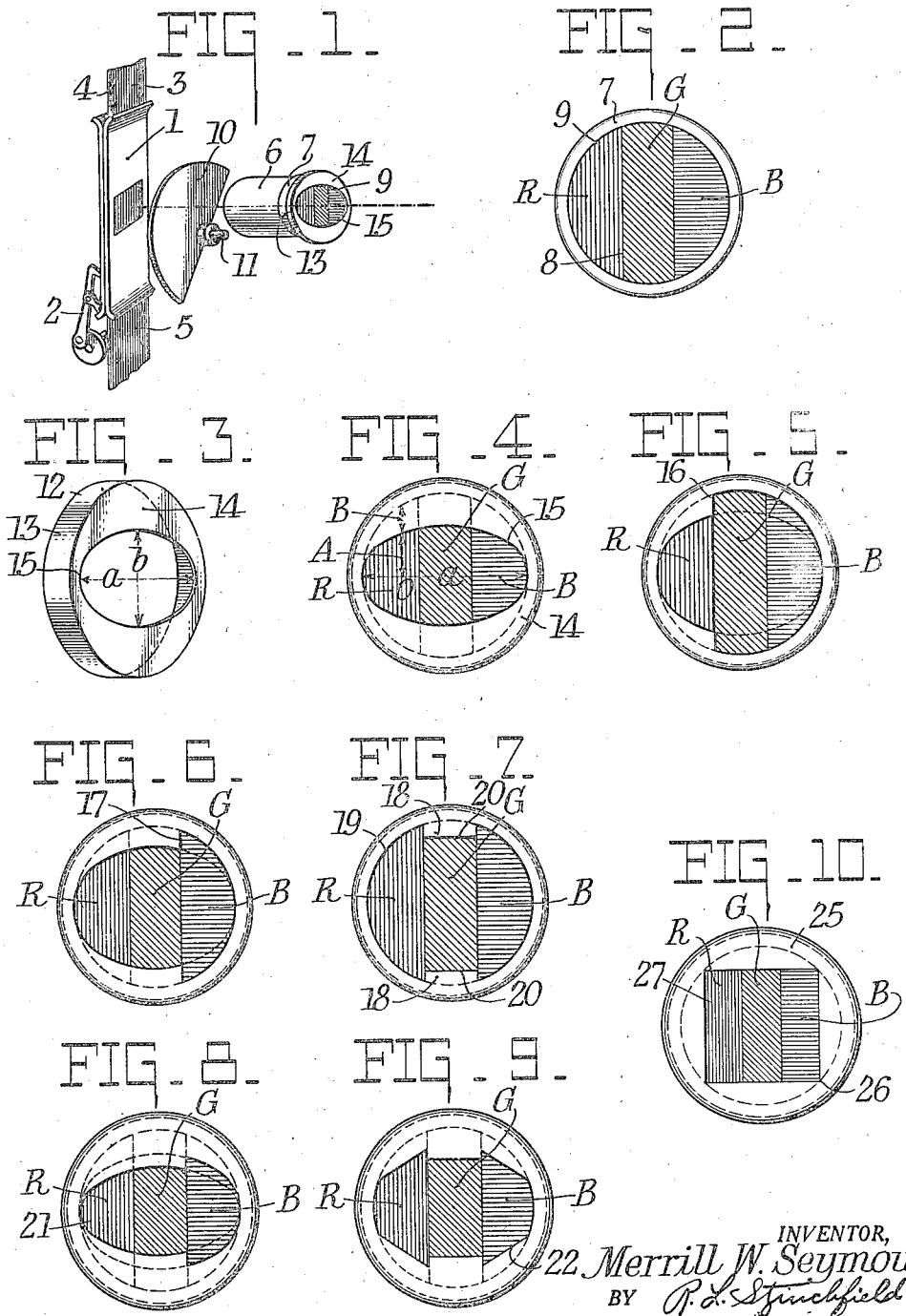

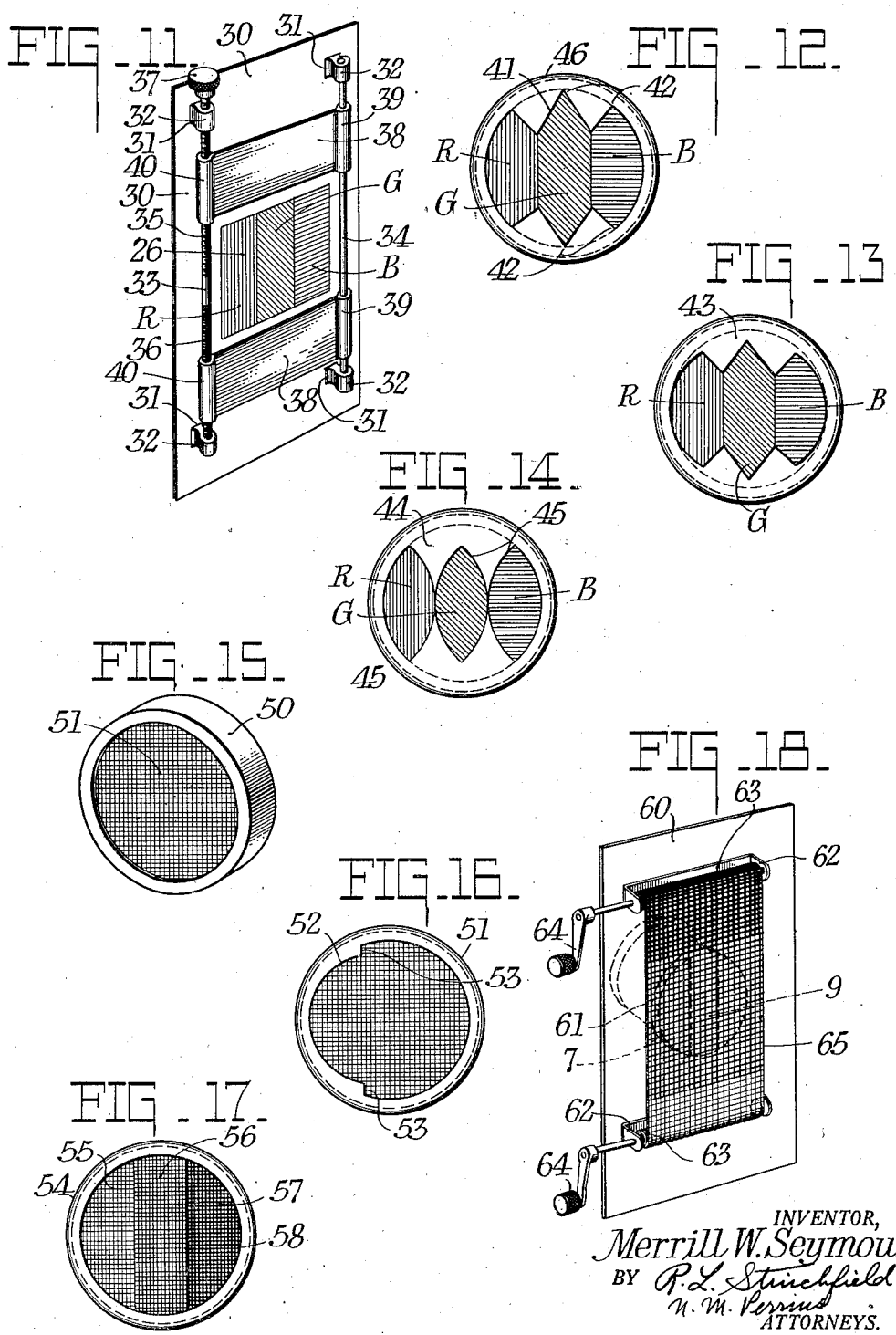

1,689,258

UNITED STATES PATENT OFFICE.

MERRILL W. SEYMOUR, OF ROCHESTER, NEW YORK, ASSIGNOR TO EASTMAN KODAK COMPANY, OF ROCHESTER, NEW YORK, A CORPORATION OF NEW YORK.

APPARATUS FOR PHOTOGRAPHIC COLOR PROCESSES.

Application filed August 22, 1927. Serial No. 214,541.

This invention relates to color processes and particularly to improvements in the process described in the patent to Berthon 992,151, granted May 16, 1911, involving the use of a photographic support having a surface with microscopic lens elements thereon and of a polychromatic screen associated with the objective.

In order to get uniform illumination it is desirable for the images of the screen to fill the fields of the minute lens elements and for this reason a limitation on the process has been the inability to use different stops or diaphragms with a particular system to compensate for different light conditions, since such stops cut down the screen area imaged by the minute lenses. While variations in exposure can be made by varying the shutter, this is not easily possible in compact portable motion picture cameras where mechanisms for varying the sector opening or the speed add to the cost, bulk and complexity of the apparatus to an undesirable extent. Moreover, if the screen were of the band type involving several color fields side by side, as is necessary when the microscopic elements are of the line or convex ridge type, approximating partial or semicylinders, a symmetrical or iris type of diaphragm would, in closing, not cover the different color fields to the same extent and would throw the color ratio out of balance.

Where a ridge type of minute lens is used with a color band screen, the cutting down of the width of the color bands alters only the area of emulsion exposed behind each minute cylindrical element but not the amount of light falling on the area actually exposed. A diaphragm or intensity controlling device should, therefore, permit the full width of such bands to be exposed, and should control the amount of light per unit area. Therefore, exposure is preferably controlled by varying the aperture only in a direction parallel to the color bands.

This invention relates to devices embodying these principles applicable to systems for carrying out this process, and overcoming the difficulties mentioned, as will be more fully understood from the following description, wherein reference is made to the accompanying drawings, in the several figures of which the same reference characters denote the same parts and in which, Fig. 1 is a diagrammatic showing of a system with which my invention is useful;

Fig. 2 is a front view of a screen used in the process;

Fig. 3 is a perspective view of a mask adapted for use with the screen;

Fig. 4 is a front view of the mask and screen together;

Figs. 5, 6, 7, 8 and 9 are front views of modified forms of mask as used with a screen;

Fig. 10 is a front view of a different shape of screen;

Fig. 11 is a perspective view of an adjustable mask used with the screen of Fig. 10;

Figs. 12, 13 and 14 are front views of still other forms of mask as used with a screen.

Fig. 15 is a perspective view of a different form of attachment;

Figs. 16 and 17 are front views of still other embodiments of my invention and

Fig. 18 is a perspective view of a front of a camera with another form of light obstructing device.

In Fig. 1 is shown, diagrammatically, certain elements of a system for taking motion pictures. A motion picture film gate is indicated at 1 and a pulldown mechanism, shown conventionally at 2, advances the film 3 by means of the perforations 4. As illustrated, the film has ridges or semi-cylinders 5 here shown as longitudinal of the film, which is adapted for the color process mentioned. An objective is carried in mount 6 which has a carrier 7 for a polychromatic screen. A semicircular shutter 10 turns about shaft 11 in properly timed relation with the pulldown.

One form of screen 9 which may be used is shown in Fig. 2 and comprises three color fields R, G and B preferably of equal area with straight boundaries 8 between them. The cap 7, of course, constitutes a frame holding the screen in position. This whole screen obviously may be used under a standard light condition with an emulsion that is properly sensitive to the three colors. The screen is applied with the bands parallel to the ridges in the film.

I provide for use with this system including the screen shown a series of masks or diaphragms for compensating for variations in intensity in the color sensitivity ratio of the emulsion and in the light conditions of the subject photographed. In Fig. 3 is shown one of these masks in the form of a cap 12 having a flange 13 adapted to fit over a screen mount 7 and having an opaque mask 14 having a diaphragm opening 15. Fig. 4 is a front view of the mask mounted over the screen. The mask opening 15 is an ellipse, the major axis, $a$, of which is the same as the diameter of the screen 9 and the minor axis, $b$, of which bears the desired ratio to the diameter of the screen. That is, at every point $o$ of the major axis, the length of a perpendicular line to a point A on the edge of the opening would have the same ratio to the length of the line to a point B on the edge of the screen. A series of such masks could be furnished giving a definitely rated series of exposures. For instance, in the particular mask shown in Figs. 3 and 4 the desired exposure is one half that of the maximum attained by the use of the whole screen. It is obvious that the proportion of the area exposed through the opening 15 to the total area of a field is the same for each of the three color fields and the color ratios are, therefore, unchanged. Moreover, since the distance $a$ is always the full width of the screen and this is transverse of the film ridges 5, the entire fields of these cylindrical lenses will be filled, and the images will be reproduced as color bands, three for each ridge.

Since different emulsions vary in their color sensitivity ratio, it is desirable to furnish masks cutting down certain of the colors only, or more than other colors. In Figs. 5, 6 and 7 are shown masks applied to the screen cutting down certain only of the colors. In Fig. 5, the mask opening 16 follows the outline of an ellipse only over the red filter band but exposes all of the green and blue fields. In Fig. 6 the mask opening 17 follows the outline of an ellipse over the red and green fields, leaving the blue field fully exposed. In Fig. 7, the green field is partially cut off by the projections 18 in the mask 19, these projections having straight edges 20.

The diaphragm opening may be so formed as to mask to different extents all of the color fields. For instance, a diaghragm giving the same color ratio as that shown in Fig. 6, but less exposure, bearing the same relation to it that the mask 14 bears to the circular screen, is shown in Fig. 8 where the opening 21 follows an ellipse of one minor axis over the color bands R and G and an ellipse of larger minor axis over the band B, the ratio, however, between the ellipses, being the same as the ratio between the minor axis of the ellipse of Fig. 6 to the diameter of the screen.

One reason for following the elliptical outline is that it furnishes a simple and accurate method of determining, laying out and stamping the openings, it being much more difficult to compute the area of openings of irregular outline. Moreover, the ellipse preserves the identical distribution of exposure as is obtained with the circle. It is to be observed that the upper and lower edges of the opening opposite each color band in Figs. 4, 5, 6 and 8 are portions of closed conic sections, that is of an ellipse or a circle.

However, openings of any configuration, so proportioned as to preserve the color ratio and to give the desired exposure, are contemplated, one example being already given in Fig. 7. Another example is shown in Fig. 9 in which the mask has an opening 22, having straight upper and lower edges extending across the several color fields and designed to give the desired color ratio and exposure.

In Fig. 10 is shown a frame or cap 25 carrying a square color screen 26 having three rectangular color bands 27. With this is used an adjustable diaphragm or mask as shown in Fig. 11.

In this figure a portion of a camera box 30 is shown, there being in front of the lens a screen 26 of the type shown in Fig. 10. Carried on the front of the camera are lugs 31, which carry eyes 32 through which pass rods 33 and 34. The rod 33 is reversely screw threaded at 35 and 36 and has a knurled head 37 by which it may be turned. Masking members 38 have at one end eyes 39 slidably engaging rod 34 and at the other end internally threaded sleeves 40 engaging the threaded portions of the rod 33, and adapted to be moved in opposite directions thereby, when the head 37 is turned. These sliding leaves constitute a diaphragm or mask member adapted to cut off light from the color bands uniformly to give the desired exposure, yet preserving the color ratio and leaving the width of the bands fully exposed for a portion of their length, so that the minute images will completely fill the spaces behind the microscopic lenses.

A particular form of my invention embodying also an invention disclosed in the application of John G. Capstaff, which matured into Patent No. 1,687,055, granted Oct. 9, 1928, is shown in Fig. 12. In this form there is a removable cap 46 similar to those previously described in its application over the screen 9 and containing an opening 41 so formed that there is formed at the top and bottom of the several color bands pointed extensions 42, exposing the bands most along their central portions. In Fig. 13 is shown a mask 43 constituting a series with that of Fig. 12 and giving a less exposure but the same color ratio. In Fig. 14 is shown another mask 44 of the same type in which the openings 45 over the several color fields are entirely separated. The advantages of the particular shapes shown in Figs. 12 to 14 are more particularly pointed out in the said Capstaff patent.

Still another expedient which may be employed to control the exposure to a predetermined extent is a light screen or filter permitting light to reach all parts of the several bands or filters but obstructing it to a uniform extent over each band. In Fig. 15 is shown a cap 50 with a filter 51 of uniform neutral density throughout, controlling equally the light to each color band. Such a filter may take some of the forms already shown, an instance being shown in Fig. 16 where the opening 51 of the cap 52 has projections 53 cutting down the area of one band as described in connection with Fig. 5 and thereby correcting the color ratio by a predetermined amount to conform to the ascertained requirements of the emulsion, and also containing a uniform neutral light filter controlling by a predetermined amount the exposure as required for taking a subject under better light conditions than those for which the screen would be used without an attachment. If the color ratio does not need correction the attachment shown in Fig. 15 would be used, while if it does an attachment embodying the principle illustrated in Fig. 16 may be used.

In Fig. 17 is shown an embodiment of the same idea in which the cap 54 has a circular opening 58 of the same size as the color screen with which it is to be used and containing a light filter consisting of three bands 55, 56, and 57 differing in density or differing slightly in color transmission whereby both the color ratio and exposure are controlled to a predetermined extent as required by the particular conditions.

In Fig. 18 there is shown a camera box 60 from the front of which protrudes a lens mount 61 carrying a screen cap 7 with screen 9. Mounted on lugs 62 above and below the objective are rolls 63, each of which has a handle 64, carrying a band 65 having a series of neutral light transmitting areas of different densities whereby the exposures may be controlled to a predetermined amount as required.

It is to be noted that in all of the forms shown, the particular attachment chosen is one that obstructs light reaching the screen and permits a predetermined amount of light to reach each color area in accordance with the ascertained requirements of the process. Where, in the claims, the word "transmit" is used, it is to be understood that it means that the area referred to permits light to pass. In a camera the factors considered in the manufacture of the attachments would be the light conditions of the subject photographed, the color sensitivity ratio of the image layer, in this case a photographically sensitive, panchromatic emulsion, the transmission characteristics of the screen bands and their shape and area, and other known constants of the instrument with which it was intended for use such as the shutter speed and relative aperture of the objective.

In a projector the principal factors to be considered would be the intensity and color ratio of the light source which would have to be compensated for to project the developed images in the photographic layer by light of colors corresponding to the taking filters. With all the forms it is to be understood that the lineal microscopic elements are parallel to the screen bands; and that by lineal I include the known types which extend as lines, ridges, or partial cylinders.

It is obvious that numerous embodiments of my invention are possible and I consider as included within my invention all such modifications and equivalents as fall within the scope of the appended claims.

Having thus described my invention, what I claim as new and desire to secure by Letters Patent is:

1. In combination in an optical system for use in a color process, a color screen and a light obstructing device, the color screen comprising distinct, differently colored, light transmitting areas and the light obstructing device having portions corresponding in position to said areas and transmitting to said several areas respectively amounts of light predetermined in accordance with the ascertained requirements of the process.

2. In combination, in an optical system for use in a color process, a color screen and a light obstructing device, the color screen comprising distinct, differently colored light transmitting bands, side by side and extending in the same direction, and the light obstructing device concealing at least a portion of said screen and having light transmitting portions corresponding to said bands and permitting light to reach the full width of said bands, the extent of the obstruction of light being predetermined as to each color band in accordance with the ascertained requirements of the process.

3. In combination, in an optical system for use in a color process, a color screen and a light obstructing device, the color screen comprising distinct, differently colored, light transmitting areas and the light obstructing device having light obstructing portions corresponding in position to said areas and permitting the passage of said areas respectively of amounts of light predetermined in accordance with the ascertained requirements of the process.

4. In combination, in an optical system for use in a color process, a color screen and a light obstructing device, the color screen comprising distinct, differently colored, light transmitting bands, side by side and extending in the same direction, and the light obstructing device comprising an apertured diaphragm open for the full width of each band and having light obstructing portions registering with the end portions of at least one of said bands.

5. In combination, in an optical system for use in a color process, a color screen and a light obstructing device, the color screen comprising distinct, differently colored, light transmitting bands, side by side and extending in the same direction, and the light obstructing device comprising a diaphragm concealing a part of the screen and having an opening, the width of which is transverse to the color bands and co-extensive with their width and the height of which, opposite each color band, is predetermined in accordance with the ascertained requirements of the color process.

6. In combination, in an optical system for use in a color process, a color screen and a light obstructing device, the color screen comprising distinct, differently colored light transmitting bands, side by side and extending in the same direction, and the light obstructing device comprising a diaphragm concealing a part of the screen and having an opening the width of which is transverse to the color bands and coextensive with their width and the height of which varies across the screen and, opposite each color band, is predetermined in accordance with the ascertained requirements of the color process.

7. In combination, in an optical system for use in a color process, a color screen and a light obstructing device, the color screen being circular and comprising distinct, parallel, differently colored, light transmitting bands substantially filling its area, and the light obstructing device comprising a diaphragm having an opening the width of which is transverse to the color bands and co-extensive with the diameter of the screen and the height of which varies across the screen, the upper and lower edges of the opening opposite each of the color bands being of the shape of a portion of a closed conic section.

8. The combination with an optical system for use in a color process and including an exposure field for a photographic layer having numerous microscopic image-forming elements associated therewith, an objective and a polychromatic screen having distinct differently colored, light transmitting areas, of a light obstructing device positioned in the path of light traversing the objective and screen to the field and having portions opposite each color area of the screen transmitting a predetermined amount of light in accordance with the ascertained requirements of the process.

9. The combination with an optical system for use in a color process and including an exposure field for a photographic layer having numerous microscopic image-forming elements associated therewith, an objective and a polychromatic screen having distinct differently colored, light transmitting areas, of a light obstructing device separate from the screen and positioned in the path of light traversing the objective and screen to the field, and having portions corresponding in position to said areas and having the property of transmitting to said several areas predetermined amounts of light, in accordance with the ascertained requirements of the process.

10. In combination with an optical system for use in a color process and including an image layer having associated therewith numerous, lineal, microscopic, image-forming elements, an objective and a polychromatic screen having a series of distinct, differently colored, light transmitting bands of definite, ascertained size and shape extending parallel to the lineal elements, of a light obstructing device situated in the path of light rays through said screen and objective to said layer and having portions corresponding to each color band of the screen transmitting to said bands respectively predetermined amounts of light in accordance with the ascertained requirements of the process, the screen being at least partially concealed by said device.

11. In combination with an optical system for use in a color process and including an image layer having associated therewith numerous, lineal, microscopic, image-forming elements, an objective and a polychromatic screen having a series of distinct, differently colored, light transmitting bands of definite, ascertained size and shape extending parallel to the lineal elements, of a light obstructing device situated in the path of light rays through said screen and objective to said layer and having portions corresponding to each color band of the screen transmitting to said bands respectively predetermined amounts of light in accordance with the ascertained requirements of the process, the screen being at least partially concealed by said device, the transmitting portions being of the full width of the color bands.

12. In combination with an optical system for use in a color process and including an image layer having associated therewith numerous, lineal, microscopic, image-forming elements, an objective and a polychromatic screen having a series of distinct, differently colored, light transmitting bands of definite, ascertained size and shape extending parallel to the lineal elements, of a diaphragm member in the path of light through said objective and screen to said layer and having an opening the effective width of which is equal to the effective width of the said color bands and the height of which opposite each color band is predetermined in accordance with the ascertained requirements of the process.

13. In combination with an optical system for use in a color process and including an image layer having associated therewith numerous, lineal, microscopic, image-forming elements, an objective and a polychromatic screen having a series of distinct, differently colored, light transmitting bands of definite, ascertained size and shape extending parallel to the lineal elements, of an apertured diaphragm member in the path of light through said system and having light obstructing portions in line with and concealing a portion of said screen and permitting light to reach the full width of each band unobstructedly, the light obstructing portions registering with the end portions of the bands.

14. In combination with an optical system for use in a color process and including an image layer having associated therewith numerous, lineal, microscopic image forming elements, an objective and a circular polychromatic screen having a series of distinct, differently colored, light transmitting bands of definite, ascertained shape lying side by side and substantially filling the area of the screen and parallel to the lineal elements, of a diaphragm member having means whereby it may be positioned in the path of light rays through said system and having an opening with a width equal to the effective diameter of the screen and varying in height, the upper and lower edges of the opening opposite each of the color bands being positioned to transmit to said bands amounts of light predetermined in accordance with the requirements of the process.

15. In combination with an optical system for use in a color process and including an image layer having associated therewith numerous, lineal, microscopic image forming elements, an objective and a circular polychromatic screen having a series of distinct, differently colored, light transmitting bands of definite, ascertained shape lying side by side and substantially filling the area of the screen and parallel to the lineal elements, of a diaphragm member having means whereby it may be positioned in the path of light rays through said system and having an opening with a width equal to the effective diameter of the screen and varying in height, the upper and lower edges of the opening opposite each of the color bands being of the shapes of portions of closed conic sections.

16. In combination with a camera for use in a color process and including an exposure field for a panchromatic sensitized layer having associated therewith numerous, lineal, microscopic, image-forming elements, an objective and a polychromatic screen having a series of distinct, differently colored, light transmitting bands of ascertained, definite size and shape, extending parallel to the lineal elements, of a light obstructing device situated in the path of light rays through said screen and objective to said layer and concealing at least a portion of said screen and having light transmitting portions in registration with said bands and permitting light to reach the full width of said bands, the extent of obstruction of light being predetermined as to the several bands in accordance with the color sensitivity ratio of the sensitive layer, the light transmission characteristics of the bands and the lighting condition affecting a subject to be photographed.

17. A light obstructing device for use in a color process with an optical system including an exposure field for a photographic layer having numerous microscopic, image-forming elements associated therewith, an objective and a polychromatic screen having distinct, differently colored, light transmitting areas of definite ascertained size and shape, the light obstructing device having portions, corresponding in position to the several areas of the screen, having the property of transmitting respectively predetermined amounts of light in accordance with the ascertained requirements of the process.

18. A light obstructing diaphragm for use in a color process with a circular screen having a series of parallel color bands and having means for attachment to such screen and having an opening with a width equal to the diameter of the screen and a height varying from side to side, the upper and lower edges of said opening corresponding to the widths of the several color bands being shaped in the form of portions of closed conic sections.

19. A light obstructing diaphragm for use in a color process with a screen having a series of parallel color bands, and having a single opening varying in height from side to side.

20. In combination, in an optical system for use in a color process, a color screen and a light obstructing device, the color screen comprising distinct, differently colored, light transmitting areas and the light obstructing device having a single light transmitting area and having light obstructing portions corresponding in position to said areas and permitting the passage to said areas of said screen respectively of amounts of light predetermined in accordance with the ascertained requirements of the process.

21. The combination with an optical system for use in a color motion picture process and including an exposure field for a photographic layer having numerous microscopic lenticular elements associated therewith, an objective and a polychromatic screen having distinct differently colored, light transmitting areas, of a light obstructing device positioned in the path of light traversing the objective and screen to the field and having a single opening, of which portions opposite each color area of the screen transmit a predetermined amount of light in accordance with the ascertained requirements of the process.

22. The combination with an optical system for use in a color motion picture process and including an exposure field for a photographic layer having numerous microscopic lenticular elements associated therewith, an objective and a polychromatic screen having distinct differently colored, light transmitting areas, of a light obstructing device separate from the screen and positioned in the path of light traversing the objective and screen to the field, and having a single light transmitting area, of which portions corresponding in position to said areas and having the property of transmitting to said several areas predetermined amounts of light, in accordance with the ascertained requirements of the process.

23. In combination with an optical system for use in a color motion picture process and including an image layer having associated therewith numerous, lineal, microscopic, lenticular elements, an objective and a polychromatic screen having a series of distinct, differently colored, light transmitting bands of definite, ascertained size and shape extending parallel to the lineal elements, of a light obstructing device situated in the path of light rays through said screen and objective to said layer and having a single light transmitting area, of which portions corresponding to each color band of the screen transmitting to said bands respectively predetermined amounts of light in accordance with the ascertained requirements of the process, the screen being at least partially concealed by said device.

24. A light obstructing device for use in a color motion picture process with an optical system including an exposure field for a photographic layer having numerous microscopic, lenticular elements associated therewith, an objective and a polychromatic screen having distinct, differently colored, light transmitting areas of definite ascertained size and shape, the light obstructing device having a single opening and having portions, corresponding in position to the several areas of the screen, having the property of transmitting respectively predetermined amounts of light in accordance with the ascertained requirements of the process.

Signed at Rochester, New York, this 17th day of August 1927.

MERRILL W. SEYMOUR.